Aug. 15, 1961  R. A. STAHL  2,996,611
ACOUSTIC MODULATOR
Filed Feb. 17, 1959

INVENTOR.
RAYMOND A. STAHL
BY
Edward M. Farrell
ATTORNEY

United States Patent Office 2,996,611
Patented Aug. 15, 1961

2,996,611
ACOUSTIC MODULATOR
Raymond A. Stahl, Roslyn, Pa., assignor, by mesne assignments, to American Bosch Arma Corporation, Hempstead, N.Y., a corporation of New York
Filed Feb. 17, 1959, Ser. No. 793,836
4 Claims. (Cl. 250—17)

This invention relates to measurement systems, and more particularly to the measurement and telemetering of acoustic signals.

In the meteorological field, it is sometimes desirable to measure various types of low level acoustic signals in the upper atmosphere. In many present systems, a radio transmitter, adapted to be modulated by the acoustic signals sought to be measured, is carried by a balloon to the desired height into the atmosphere. Various different methods are then employed for modulating the carrier signal of the transmitter, which is transmitted to a ground receiving station or other remote point.

In such measurement and telemetering systems, it is often necessary to apply calibration signals periodically to modulate the carrier of the transmitter to provide reference signals from which various measurements may be calculated at the receiving station. Heretofore, the measurement and telemetering of acoustical information and calibration signals have involved various electronic techniques and have included the use of amplifiers, audio oscillators, gate oscillators, power gates, as well as the use of numerous batteries. In general, these systems have been extremely complex and expensive.

It is the object of this invention to provide a novel means for measuring and telemetering acoustic signals.

It is a further object of this invention to provide a novel means for periodically applying calibration signals to a transmitter employed for telemetering acoustic signals.

It is still a further object of this invention to provide a novel means for telemetering acoustic signals from the upper atmosphere utilizing a minimum amount of electronic circuitry and power.

It is still a further object of this invention to provide a novel means of producing calibration signals in the upper atmosphere without the use of complex or expensive electronic circuitry.

In accordance with the present invention, a transmitting system for telemetering acoustic signals includes an oscillator. The oscillator is adapted to be modulated in accordance with the movement of a mechanical element disposed adjacent thereto. A diaphragm is disposed to respond to acoustic signals. Means for coupling the diaphragm to the element is provided to move the element in accordance with the low level acoustic signals to modulate the oscillator. Means for mechanically producing acoustic calibration signals and periodically applying them to modulate the transmitter is also provided.

Other objects and advantages of the present invention will be apparent and suggest themselves to those skilled in the art to which the present invention is related, from a reading of the following specification and claims, in conjunction with the accompanying drawings, in which:

Figure 1:
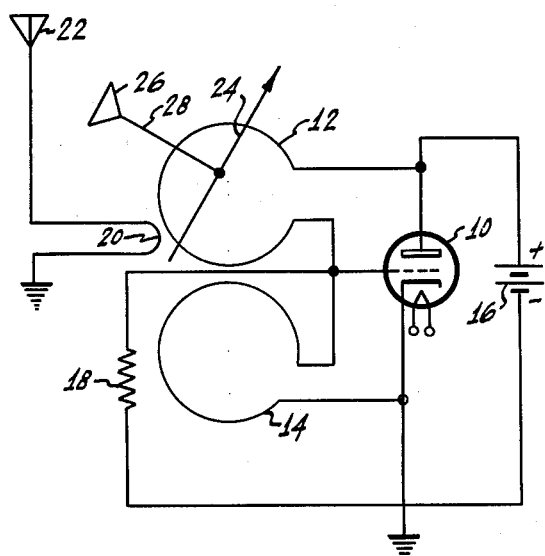
FIGURE 1 is a schematic diagram illustrating a form of oscillator circuit, which may be employed in connection with the present invention.

Referring particularly to FIGURE 1, there is illustrated an oscillator circuit designed for radiosonde service at 1680 megacycles. A vacuum tube 10 may be of the so-called "pencil type" tube with integral resonators 12 and 14. This type of tube is well known and may be of the Type 5794 or the Type 6562, manufactured by Radio Corporation of America and other companies.

Operating power for the oscillator is provided by a battery 16. A resistor 18 is connected between the control grid and the cathode of the vacuum tube 10. Resistor 18 determines the current within the tube 10. Oscillations are sustained by a feedback arrangement from the resonator 12 to the resonator 14. The signal developed across the resonator 12 is coupled to a coil 20 which is connected to an antenna 22. The signal of the oscillator may be transmitted to a ground receiving station from the antenna 22.

A movable element 24 is disposed adjacent the integral resonator 12 to vary the frequency of the oscillator. The variation in frequency when the element 24 is moved is a result of a variation in the capacitance associated with the resonator 12 caused by the changed position of the element 24. A diaphragm 26, or other type pick-up, is disposed to respond to low level acoustic signals. A connecting link 28 couples the mechanical movements of the diaphragm 26 to the element 24 thereby causing the frequency of the oscillator to be varied in accordance with the movements of the diaphragm 26.

It is noted that heretofore a fixed mechanical slug was associated with the resonator 12 to provide a fine adjustment means for the frequency of the oscillator. Such slugs were generally made in the form of screw adjustment and adapted to be fixed in place once the desired frequency of the oscillator had been reached. This arrangement will be seen more clearly in connection with FIGURE 3.

Figure 2:
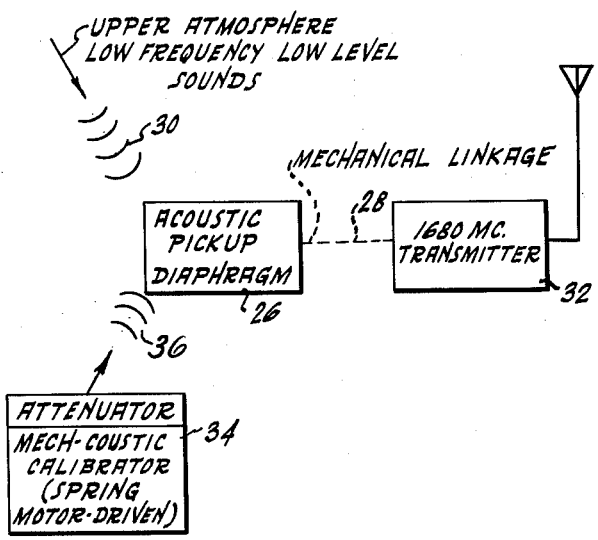
FIGURE 2 is a functional block diagram, illustrating the present invention; and, FIGURE 3 illustrates a mechanical device, partly in cross section, illustrating one form of the present invention.

Referring particularly to FIGURE 2, a general system illustrating the present invention is shown. Upper atmosphere, low frequency, low level acoustic signals are illustrated by the waves 30. These waves are picked up by acoustic pick-up diaphragms 26 and coupled to a transmitter 32 through the coupling link 28. The transmitter 32, which may be operative at 1680 mc., would normally include all the circuitry illustrated in FIGURE 1.

Means for providing a calibration signal, to be more clearly described in connection with FIGURE 3, includes a device 34 for periodically producing acoustic signals illustrated as waves 36. The device 34 may be a motor or spring driven device and may include an attenuator for controlling the amplitude of the generated calibration signals. The waves 36 are produced periodically at predetermined time intervals and are of a fixed frequency and amplitude. The waves 36 are picked up by the diaphragm 26 and are used to modulate the transmitter 32 in substantially the same manner as the upper atmosphere sound waves 30.

Figure 3:
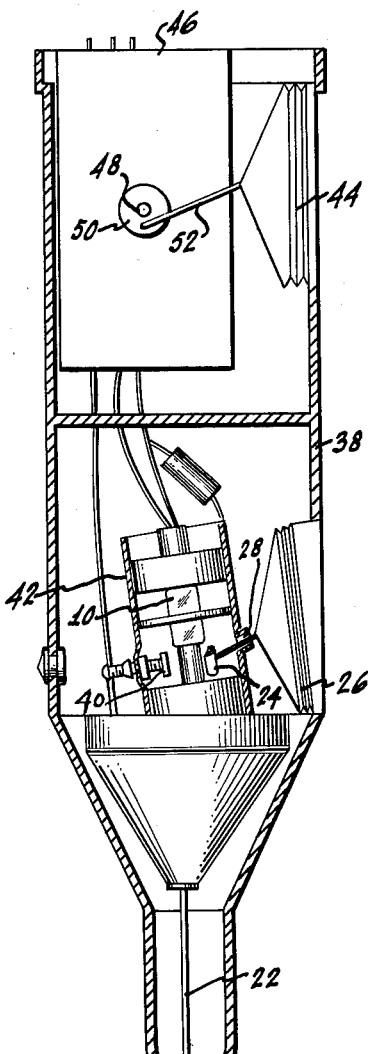

Referring particularly to FIGURES 1 and 3, a plastic housing 38 includes telemetering and calibration equipment of a system embodying the present invention. The entire plastic housing 38 may be physically attached to a balloon and carried into the atmosphere to a desired altitude. The use of such balloons are well known to those in the meteorological and weather forecasting fields, for example, and therefore are not shown or described in detail.

In considering first the operation relating to the telemetering of the information signals from the upper atmosphere involving the arrangement discussed in connection with FIGURE 1, the oscillator vacuum tube 10 is mechanically fixed within the plastic housing 38. The output signal from the vacuum tube 10 is eventually applied to the antenna 22 for transmission to a ground receiving station or other remote point. A slug 40 threadedly engages an outer plate member 42 and is adapted to be moved adjacent the vacuum tube 10, to vary the capacitance associated therewith. Movement of the slug 40 varies the oscillator frequency and permits a fine tuning of the oscillator. When the oscillator is operating at the desired frequency, the slug 42 is fixed in place. The use of mechanical tuning by varying the position of a frequency adjustment screw located on the outer shell of the tube 10 has been used in connection with circuits involving the aforementioned "pencil type" tubes.

The diaphragm 26 is disposed within the plastic housing 38 and adapted to respond to low level acoustic signals, which may be in the upper atmosphere, for example. The diaphragm 26 is coupled to the element 24 through the coupling link 28. The element 24 is adapted to be moved in response to the acoustic signal applied to the diaphragm 26 to thereby frequency modulate the oscillator associated with the vacuum tube 10. Movement of the element 24 varies the capacitance associated with the timed oscillator circuit to thereby vary the resonant frequency of the oscillator.

It is thus seen that the use of a diaphragm to produce movement of the element 24 has provided a relatively simple means for modulating an oscillator circuit. This frequency modulation of the oscillator is achieved without the use of complicated or expensive electronic circuitry.

As previously mentioned, it is desirable in systems such as the one described to periodically provide a calibration signal. This calibration signal may be applied to the transmitter for transmission to the ground receiving station to provide a point of reference from which the information signals received may be calculated.

The present invention provides a relatively simple mechanical means for producing this calibration signal. A diaphragm 44 is used to produce a calibrating signal of a predetermined amplitude and frequency. A timing mechanism 46 may include a motor for driving a shaft 48. A circular plate member 50 includes a link 52 mechanically attached thereto for driving the diaphragm 44. The amplitude of the signal will be determined by the position of the link 52 on the circular plate member 50, with the frequency generated by the diaphragm 44 being dependent upon the rotations of the shaft 48.

In one embodiment of the present invention, the frequency generated may be made variable between 2 and 100 cycles per second. The calibrating tone generated may be a series of pulsed sine waves, being on for 80 milliseconds and off for 20 seconds. A timing mechanism 46 may include either an electrically driven timing device and motor or a spring wound device.

The device utilized for calibration purposes is similar in some respects to the so-called "pistonphone" design which is discussed in a book entitled "Acoustical Engineering," by Olsen, on page 474, copyrighted 1957, and published by D. Van Nostrand Company, Inc. The device described by Olsen was used for calibrating a microphone at low frequencies.

When an acoustic signal is generated by the diaphragm 44 a sound wave will be produced in the space surrounding the diaphragm 44. This space may be at some point high within the atmosphere. The acoustical signal generated by the diaphragm 44 is picked up by the diaphragm 26 to cause corresponding movements therein. The movements of the diaphragm 26 causes the oscillator associated with the vacuum tube 10 to be frequency modulated in accordance with the calibration signal generated.

Thus it is seen that the present invention has provided a relatively simple telemetering system including calibration without resorting to complex or expensive electrical equipment. The device disclosed is particularly suited for systems wherein it is desired to measure low frequency, low level acoustical signals in the atmosphere as is necessary in many applications connected with meteorological or weather forecasting fields.

What is claimed is:

1. In combination with a housing member, a transmitter for transmitting acoustical information and calibration signals from the atmosphere, said transmitter including an oscillator having an electron discharge device, a movable element disposed adjacent said electron discharge device of said oscillator to control the frequency of said oscillator, a first diaphragm responsive to acoustical signals, means for coupling said first diaphragm to said element to move said element in accordance with acoustical signals applied to said diaphragm, a second diaphragm, and a motor for driving at periodic intervals said second diaphragm to provide acoustical calibration signals of relatively fixed frequency and amplitude, said first diaphragm being responsive to said acoustical calibration signals to frequency modulate said oscillator.

2. In combination with a housing member adapted to be carried into the atmosphere, a transmitter for transmitting low level acoustical information and calibration signals from the upper atmosphere, said transmitter including an oscillator having an electron discharge device, a movable element disposed adjacent said electron discharge device of said oscillator, the position of said element controlling the frequency of said oscillator, a first diaphragm responsive to low level acoustical signals, means for mechanically coupling said first diaphragm to said element to move said element in accordance with low level acoustical signals applied to said diaphragm to frequency modulate said oscillator, a second diaphragm disposed in relatively close relationship to said first diaphragm, and a motor for driving at periodic intervals said second diaphragm to provide acoustical calibration signals of relatively fixed frequency and amplitude, said first diaphragm being responsive to said acoustical calibration signals to frequency modulate said oscillator.

3. A system for telemetering acoustical signals from the upper atmosphere comprising a transmitter, said transmitter including an oscillator having an electron discharge device, a movable capacitive element disposed adjacent said electron discharge device of said oscillator, the position of said capacitive element controlling the frequency of said oscillator, a transducer responsive to acoustical signals, means for coupling said transducer to move said movable capacitive element to frequency modulate said oscillator, and a motor for periodically mechanically producing acoustical calibration signals of relatively fixed frequency and amplitude, said transducer being responsive to said acoustical calibration signals to frequency modulate said oscillator.

4. In combination with a housing member adapted to be carried into the atmosphere, a transmitter for transmitting low level acoustical information and calibration signals from the upper atmosphere to a remote receiving station, said transmitter including a radio frequency oscillator having a vacuum tube device, a movable capacitive element disposed adjacent said vacuum tube device, the position of said capacitive element controlling the frequency of said oscillator, a first diaphragm responsive to low level acoustical signals, means for mechanically coupling said first diaphragm to said capacitive element to move said element in accordance with low level acoustical signals applied to said diaphragm to frequency modulate said oscillator, a second diaphragm disposed in relatively close relationship to said first diaphragm, a motor for periodically mechanically driving said second diaphragm to provide acoustical calibration signals of relatively fixed frequency and amplitude, said first diaphragm being responsive to said acoustical calibration signals to frequency modulate said oscillator, an antenna for radiating radio signals, and means for coupling the output signals from said oscillator to said antenna for transmission to said remote receiving station.

References Cited in the file of this patent

UNITED STATES PATENTS

| | | |
|---|---|---|
| 2,311,491 | Turner | Feb. 16, 1943 |
| 2,421,081 | O'Brien | May 27, 1947 |